March 16, 1943.     K. M. ARMANTROUT     2,313,717
TRANSMISSION CONTROL
Filed July 24, 1941     2 Sheets-Sheet 1

Inventor:
Kenneth M. Armantrout
By Edward C. Gritzbaugh
Atty.

March 16, 1943.   K. M. ARMANTROUT   2,313,717
TRANSMISSION CONTROL
Filed July 24, 1941   2 Sheets-Sheet 2
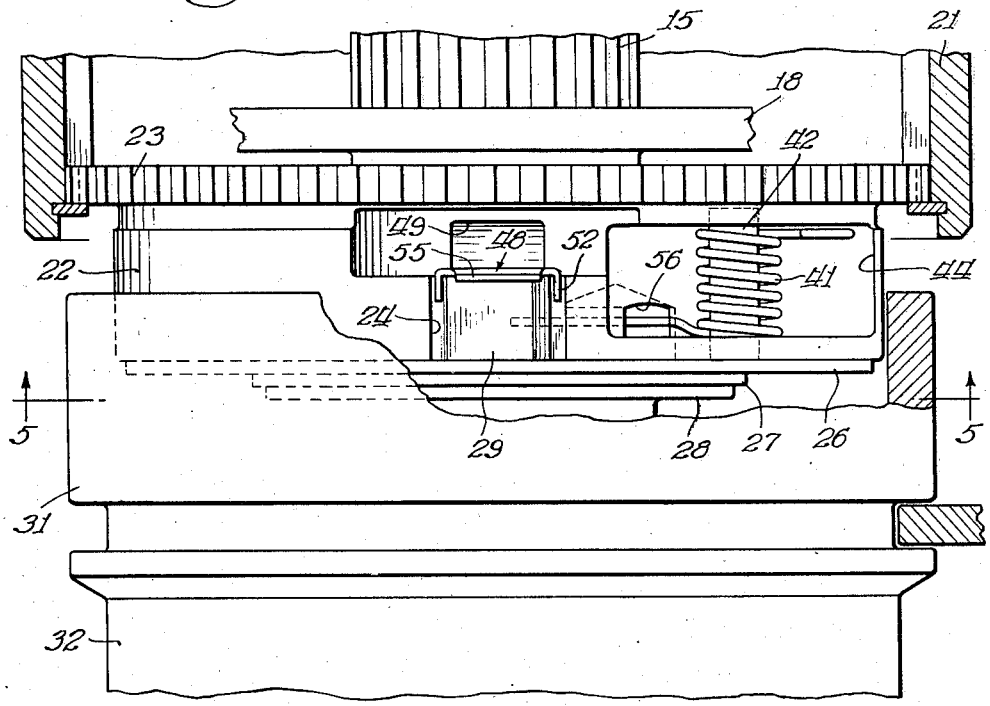
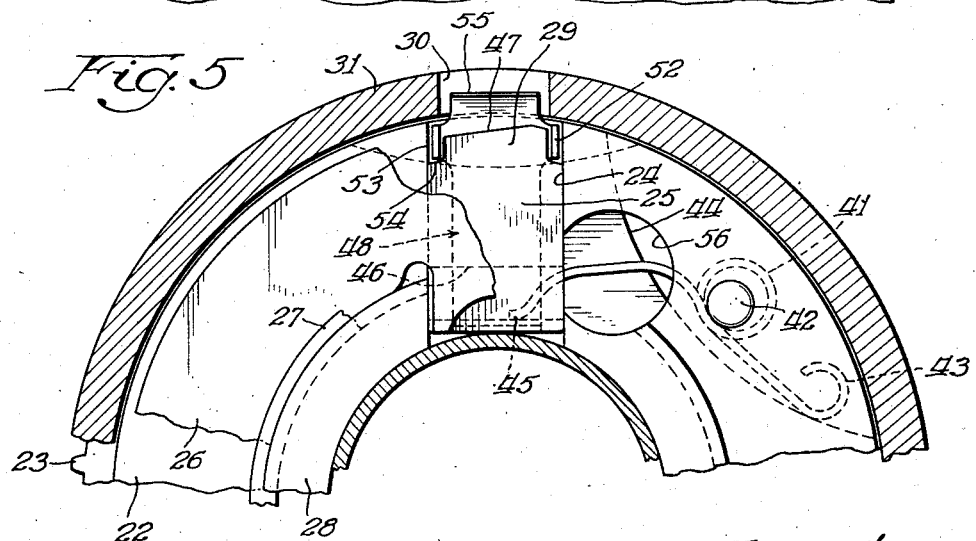
Inventor:
Kenneth M. Armantrout
By Edward C. Gritzbaugh
Atty Patented Mar. 16, 1943

2,313,717

UNITED STATES PATENT OFFICE 2,313,717

TRANSMISSION CONTROL

Kenneth M. Armantrout, Muncie, Ind., assignor to Borg-Warner Corporation, Chicago, Ill., a corporation of Illinois Application July 24, 1941, Serial No. 403,837

15 Claims. (Cl. 192—105)

This invention relates to power transmitting mechanism of the type wherein a change in the torque conditions in the mechanism is effected by shifting movement of a positive coupling element under the control of centrifugal force and wherein supplementary control is provided by a device shiftable to a position in which it is adapted to establish conditions different from those established by the centrifugal mechanism. The object of the invention is, in general, to provide means actuated in timed relation to the movement of such shiftable device for rendering the coupling element inoperative.

In its more specific aspects, the invention deals with speed responsive clutch mechanism of a type wherein a windowed sleeve is shiftable from a position in which it is adapted to receive a centrifugally controlled coupling element for establishing a drive, to a position in which the coupling element cannot couple therewith, and it is an object of the invention to provide means, rendered effective by movement of the sleeve to the last mentioned position, for restraining the coupling element from contact with the sleeve.

Another object of the invention is to provide, in a transmission of a type embodying a centrifugal force responsive clutch having radially movable pawls and a windowed sleeve member shiftable from a position wherein the clutch is operative to a position wherein it establishes a drive of a ratio different from that established by the clutch, means rendered effective by movement of said member to the last mentioned position, for restraining the radially movable pawls from contact with the windowed sleeve of the clutch.

The primary purpose of the invention is to eliminate all contact between a centrifugally controlled clutch element and its coacting clutch member except when the mechanism is conditioned for the establishment of clutch engagement between said element and member, so as to avoid "scrubbing" of the centrifugal element against the coacting clutch member, and the wear and destruction attendant thereon.

Attempts have been made in the past to solve this problem by employing a balk ring controlled by differential rotation of the respective driving and driven members of a "Keller" clutch. Such a balk ring depends upon frictional engagement with one of the members. The present invention eliminates the dependence upon such frictional engagement and provides a positive actuation of the pawl restraining means in accordance with the position of a shiftable drive establishing device such as the combined direct drive lock-up sleeve and window member of an overdrive transmission. Thus the device is positive in operation. In addition, the invention provides a pawl restraining mechanism which is of exceedingly simple construction and does not greatly increase the cost of production of a transmission in which it is incorporated.

Other objects, the advantages and uses of the invention will become more apparent after reading the following specification and claims, and after consideration of the drawings forming a part of the specification, wherein:

Fig. 4 is a plan view, partially in section, of the mechanism; and

Fig. 5 is a transverse sectional view of the same taken on the line 5—5 of Fig. 4.

Figure 1:
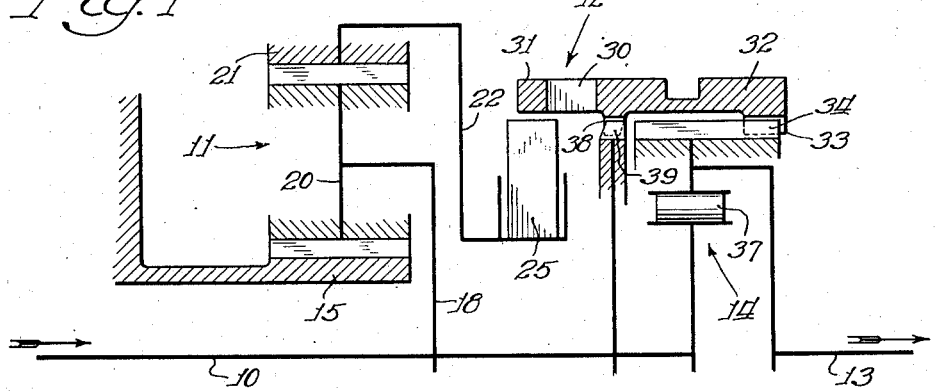
Fig. 1 is a diagram of a transmission embodying the invention.

As an example of one form of mechanism in which the invention may be embodied, I have shown in the drawings an overdrive transmission comprising a drive shaft 10, planetary gearing indicated generally at 11, a positive clutch, indicated generally at 12, adapted to connect the drive shaft 10 to the driven shaft 13 through the medium of the planetary gearing 11, and an overrunning clutch, indicated generally at 14, adapted to establish a direct one-way drive between the drive shaft 10 and the driven shaft 13 when the clutch 12 is disengaged. The planetary gearing 11, when the clutch 12 is engaged, is adapted to overdrive the driven shaft 13.

The planetary gearing 11 includes a sun gear 15 through which the drive shaft 10 extends and with reference to which the drive shaft 10 is freely rotatable. The sun gear 15 is secured, either permanently or by releasable means, to a non-rotating member such as a portion of the housing of the transmission. Splined at 16 on the drive shaft 10 is the hub portion 17 of a planet carrier 18. Mounted in the carrier 18 are pinion shafts 19 on which are journalled the planet pinions 20 meshing with the sun gear 15. With the sun gear 15 stationary, the planet pinions 20 will track thereon so as to transmit rotation at a faster rate of speed than that of the drive shaft 10, to the ring gear 21 encircling the planet pinions 20 and meshing therewith.

The overdrive thus received by the ring gear 21 is transmitted through the clutch 12 which comprises an annular pawl carrier 22 having a toothed periphery 23 splined to the teeth of the ring gear 21. The carrier 22 is provided with a radial slot 24, in which is mounted a centrifugal force responsive pawl 25. The pawl 25 is confined axially by a retainer washer 26 held in place against the rear face of the carrier 22 by a snap ring 27 recessed into the hub region 28 of the carrier.

The outer end of the pawl 25 is reduced in circumferential width to form the coupling element 29 adapted to be received in a window 30 in the clutch shell 31, thus to establish a drive through the clutch 12. The inner region of the pawl 25 constitutes centrifugal weight mechanism for urging the coupling element 29 toward engaged position when the pawl carrier is rotated.

The shell 31 is formed integrally with a clutch sleeve 32 which has internal teeth 33 slidingly meshing with external teeth 34 on the periphery of the overrunning clutch drum 35 formed integrally with the driven shaft 13. Thus the sleeve 32 is drivingly connected at all times with the driven shaft, while being capable of axial shifting movement.

Figure 2:
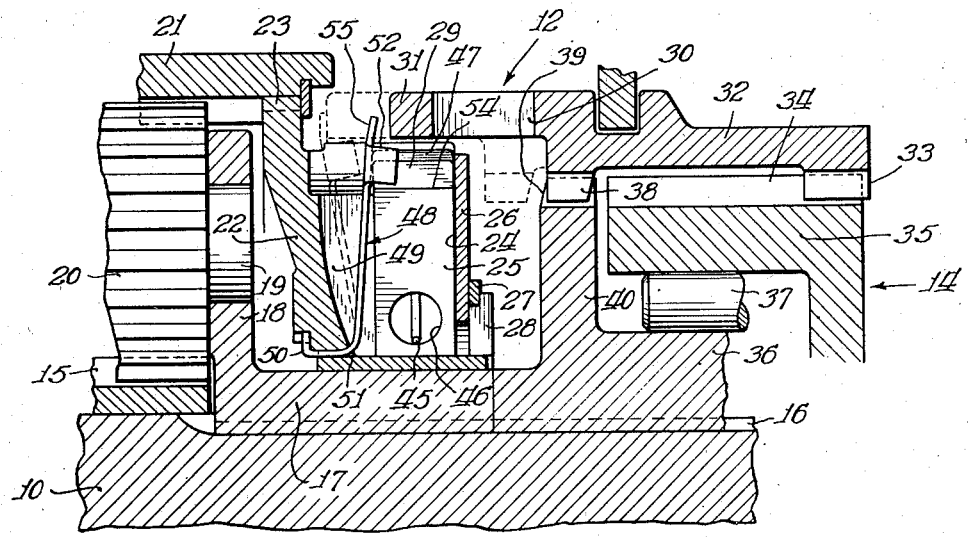
Fig. 2 is an axial sectional view of a clutch mechanism embodying the invention.
Figure 3:
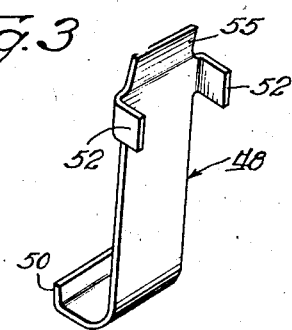
Fig. 3 is a perspective view of the pawl restraining latch element.

With the shell 31 in the position shown in dotted lines in Fig. 2, and with the pawl 25 retracted, direct drive will be transmitted from the drive shaft 10 to the driven shaft 13 through the medium of the overrunning clutch 14 which comprises the drum member 35, a core member 36 formed integrally with the planet pinion carrier hub 17, and a series of clutch rollers 37. When the sleeve 32 is in the position shown in full lines in Fig. 2, it is adapted to establish a two-way drive bridging the overrunning clutch 14. To this end, the sleeve 32 is provided with internal teeth 38 adapted to mesh with external teeth 39 on the periphery of a flange 40 formed integrally with the pinion carrier hub 17.

The pawl 25 is urged inwardly toward its disengaged position by a spring (Fig. 5) having a central loop 41 encircling a pin 42 mounted in the carrier 22, an end portion 43 engaged against the bottom of a recess 44 in the carrier 22, and an end 45 engaged in an opening 46 in the pawl. The recess 44 is milled into the periphery of the pawl carrier. The end portion 45 extends from the recess 44 into the pawl slot 24 through a passage 56 drilled axially into the side of the carrier 22.

Assuming now that the shell 31 is in position to receive the coupling element 29, and that the torque is being transmitted from the drive shaft 10 to the driven shaft 13 through the overrunning clutch 37, an increase in the speed of rotation to a predetermined point will develop sufficient centrifugal force in the pawl 25 to overcome the restraining force of the spring member 45, whereupon the pawl will move outwardly into engagement with the shell 31. The pawl carrier will however, be rotating at a faster rate of speed than the shell 31, owing to the overdrive through the planetary gearing 11, and the coupling element 29 will ratchet against the interior of the shell. In order that ratcheting may occur, the end of the coupling element 29 is beveled as at 47. With the pawl ratcheting, engagement of the clutch may be effected by decelerating the drive shaft 10 until the speed of rotation of the carrier has decreased to that of the shell 31, permitting the coupling element 29 to enter the window 30.

The mechanism described above is that of a conventional overdrive transmission. When the shell 31 of such a transmission is in the position shown in full lines in Fig. 2, the window 30 is out of register with the clutch element 29 and the end region of the shell blocks radially outward movement of the pawl 25. With the parts in this position, the pawl will move outwardly to bring the coupling element 29 into engagement with the end region of the shell 31 at all times when the speed of the rotation of the carrier is in the overdrive range. This will cause a constant scrubbing of the coupling element against the interior surface of the shell, since the pawl carrier will be constantly overdriven with reference to the shell as long as a one-to-one ratio exists between the driving and driven shafts.

The invention provides means for restraining the pawl out of engagement with the shell 31 so as to completely eliminate such scrubbing action when the shell 31 is in the two-way direct drive position. Such restraining means comprises an element which is adapted to assume a restraining position when the sleeve is in direct two-way drive position and to be engaged by the sleeve as the latter moves toward coupling position, and thereby moved away from the restraining position.

In the specific embodiment shown in the present application, the restraining element comprises a latch 48 of spring metal positioned in a radial recess 49 in the pawl carrier 22. The latch 48 is formed at its inner end with a hook 50 which is anchored in an opening 51 in the carrier 22. At its outer end, the latch 48 is formed with latch fingers 52 which are adapted to enter the spaces 53 formed between the sides of the pawl recess 24 and the reduced coupling element 29. The latch fingers 52 coact with shoulders 54 defined between the clutch portion 29 and the body of the pawl, for blocking outward movement of the pawl. The outer end portion 55 of the latch projects into the path of axial shifting movement of the sleeve 31 so as to be engaged by the latter as it is shifted from its full line position to its dotted line position shown in Fig. 2. The latch is so formed and mounted as to be biased under its own spring pressure toward its obstructing position shown in full lines in Fig. 2, and is bent back to its non-obstructing position shown in dotted lines in Fig. 2, by the movement of the sleeve 31, being thereby placed under tension so as to follow the sleeve back to its obstructing position when the sleeve is shifted back to the two-way direct drive position.

When the latch is in the non-obstructing position, the pawl 25 may move outwardly to establish the drive through the clutch 12. When the latch is in its obstructing position, the latch fingers 52, engaging the shoulders 53, will restrain the pawl in a position in which there is no contact between the coupling portion 29 and the shell 31.

It is understood that the foregoing description is merely illustrative of a preferred embodiment of the invention and that the scope of the invention is not to be limited thereto, but is to be determined by the appended claims.

I claim:

1. In a mechanism for transmitting torque from a driving to a driven member, means for changing the torque including a positive coupling element, centrifugal force responsive means for moving said element, a cooperating coupling member shiftable to and from a position wherein said element is adapted to establish positive coupling engagement therewith, and means actuated in timed relation to the movement of said cooperating member from said position to render said centrifugal force responsive means ineffective to move said element to coupling position.

2. In a centrifugal positive clutch including a centrifugal force responsive coupling element and a clutch member shiftable to and from a position wherein said element may engage therewith to establish a drive, means rendered effective by shifting of said member away from said position, for holding said coupling element out of contact with said clutch member.

3. In a centrifugal positive clutch, a pawl carrier, a radially movable centrifugal force responsive pawl including a coupling element, mounted in said carrier, a shell having a window adapted to receive said coupling element, said shell being movable from a position wherein said window is adapted to register with said coupling element to a position wherein said window is out of register with the coupling element, and means rendered effective by movement of said shell to the latter mentioned position, for restraining said coupling element out of contact with the shell.

4. In a mechanism for transmitting torque from a driving to a driven member, means including a centrifugal positive clutch for establishing a drive between said members, a device shiftable to establish a drive of a different character between said members, and means actuated in timed relation to the shifting movement of said device for rendering said centrifugal clutch ineffective to establish said first mentioned drive when said second mentioned drive is established.

5. Power transmitting mechanism comprising driving and driven members, means including a coupling element adapted to shift under the control of centrifugal force for establishing a drive of one ratio between said members, means including a shiftable device for establishing a drive of a different ratio between said members, and means rendered effective by shifting movement of said device for restraining said coupling element in an inoperative position when the said drive of a different ratio is established.

6. A positive clutch as defined in claim 2, wherein said means rendered effective by shifting movement of said device comprises a spring element biased toward restraining position and adapted to be engaged by the shell and moved to non-restraining positions when the shell is moved to its first-mentioned position.

7. A torque transmitting mechanism as defined in claim 5, wherein said restraining means comprise a spring element biased toward restraining position and adapted to be engaged by said shiftable device and to move to a non-restraining position when said shiftable device is moved away from its position in which it establishes said drive of a different ratio.

8. A positive clutch as defined in claim 3, wherein said restraining means comprises a spring latch element positioned radially beside the coupling element, and anchored at its inner end to the pawl carrier in such a manner as to be biased toward restraining position, said latch element having at its outer end latch means adapted to block the path of projection of the coupling element when it is in its restraining position, and adapted to be engaged at said outer end by said shell when the latter is moved to its first-mentioned position, and to be thereby moved to non-restraining position.

9. A power transmitting mechanism as defined in claim 5, wherein said restraining means comprises a spring latch element anchored at one end to the pawl carrier and biased at its other end toward restraining position, and having at said other end latching means for blocking radially outward movement of the coupling element when in said restraining position.

10. A centrifugal positive clutch as defined in claim 3, wherein said coupling element is of reduced width with reference to the remainder of the pawl so as to define a pair of shoulders, and wherein the restraining element is formed with a pair of spaced latching fingers adapted to embrace the coupling element and coact with said shoulders.

11. A power transmitting mechanism as defined in claim 5, including a centrifugal force responsive radially movable pawl having an outer end of reduced width constituting said coupling element, and wherein said restraining means comprises a latch of spring material positioned radially adjacent the pawl and anchored at its inner end to the carrier in such a manner as to be spring biased toward restraining position, and formed at its outer end with a pair of spaced axially extending latch fingers adapted to receive said coupling element and to coact with shoulders defined in the pawl by said reduced end portion.

12. In a mechanism for transmitting torque from a driving to a driven member, means including a centrifugal positive clutch for establishing a drive of one ratio between said members, a clutch device manually shiftable to establish a drive of a different ratio between said members, and means actuated in timed relation to the shifting movement of said clutch device for rendering said centrifugal clutch inoperative while the latter mentioned drive is established.

13. Power transmission mechanism comprising driving and driven members, means including a centrifugal positive clutch for establishing a drive between said members, said clutch including a coupling element movable under the control of centrifugal force from a retracted to a projected position, and a coacting clutch device shiftable from a position wherein said element is adapted to be coupled therewith when projected, to a position wherein it establishes a drive of a different character between said members, and means actuated in timed relation to the movement of said device to its latter mentioned position, for restraining said element in its retracted position.

14. In a transmission for automotive vehicles, means including a centrifugal positive clutch for establishing a drive of a non-direct ratio, said clutch including driving and driven members and a centrifugal force responsive pawl carried by one of the members and movable into and out of clutching engagement with the other member, an overrunning clutch adapted to automatically establish a one-way direct drive when said positive clutch is released, means to establish a two-way direct drive across said overrunning clutch, and means, rendered effective when said last means is moved to operative position to hold said pawl out of contact with said other member.

15. In a transmission for automotive vehicles, means including a centrifugal positive clutch for establishing a drive of one ratio, said clutch including driving and driven members and a centrifugal force responsive pawl carried by one of the members and movable into and out of clutching engagement with the other member, means to automatically establish a drive of a different ratio upon disengagement of said clutch, means to lock out said last named means against release, and means rendered effective, when said lock out means is moved to operative position, for restraining said pawl in its disengaged position to prevent scrubbing of the pawl against said other member.

KENNETH M. ARMANTROUT.